March 9, 1926.
H. BECKWITH
1,576,264
SICKLE BAR ADJUSTING MEANS
Filed June 4, 1925
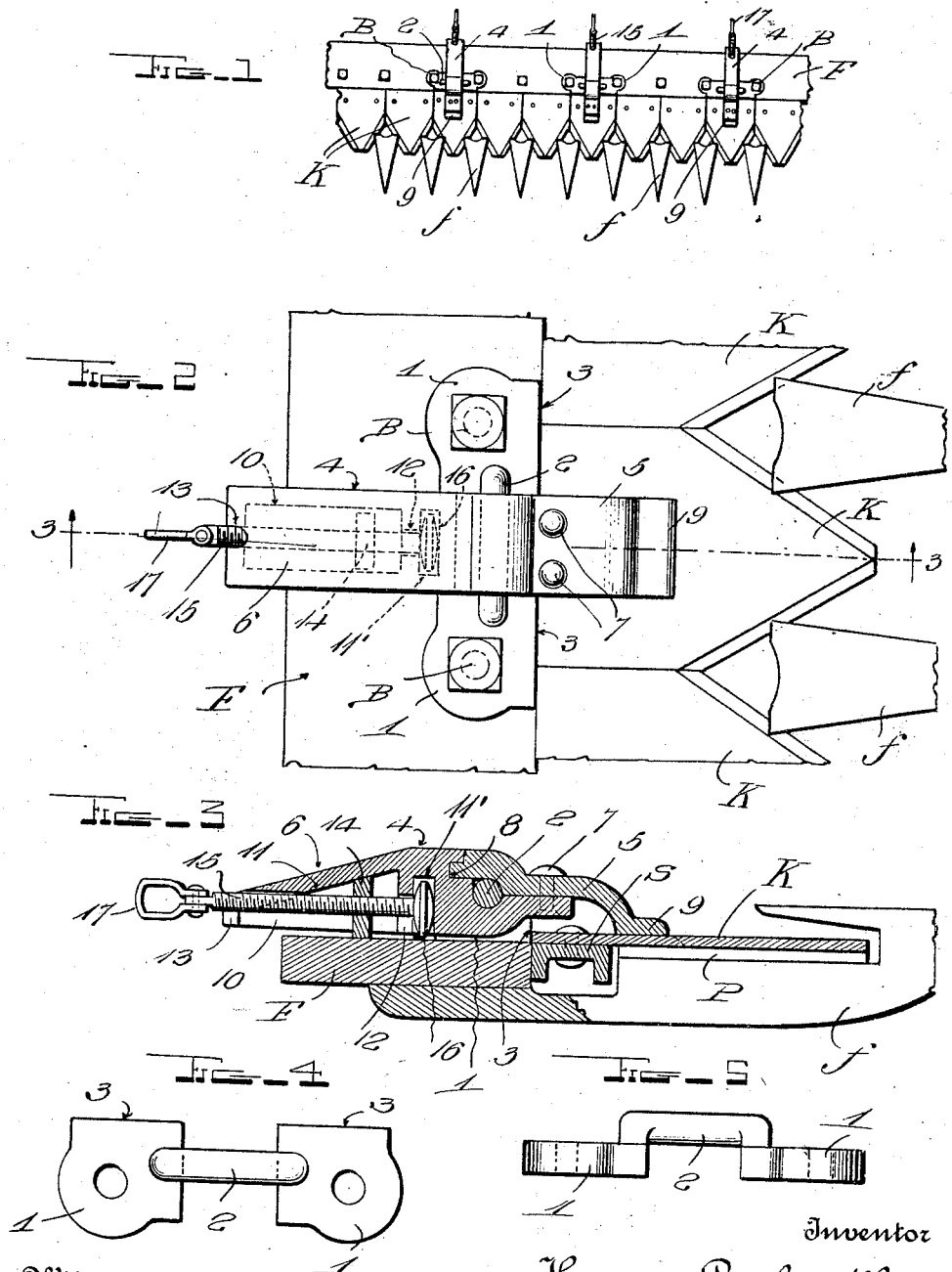
Inventor
Harvey Beckwith
Attorneys Patented Mar. 9, 1926.

1,576,264

UNITED STATES PATENT OFFICE.

HARVEY BECKWITH, OF TRACY, CALIFORNIA.

SICKLE-BAR-ADJUSTING MEANS.

Application filed June 4, 1925. Serial No. 34,959.

*To all whom it may concern:*

Be it known that I, HARVEY BECKWITH, a citizen of the United States, residing at Tracy, in the county of San Joaquin and State of California, have invented certain new and useful Improvements in Sickle-Bar-Adjusting Means; and I do declare the following to be a full, clear, and exact description of the invention, such as will enable others skilled in the art to which it appertains to make and use the same.

My invention relates to improvements in mowing mechanisms, such as those used on harvesters and ordinary mowing machines, in which a reciprocatory sickle bar co-operates with ledger plates carried by the guard fingers of a finger bar. The object of the invention is to provide a simple and inexpensive, easily adjusted and efficient device for holding the knives of the sickle bar tightly against the ledger plates, to insure efficient cutting.

With the foregoing in view, the invention resides in the novel subject matter hereinafter described and claimed, the description being supplemented by the accompanying drawings.

Figure 1 is a small top plan view of portions of a finger bar and sickle bar, showing the improved adjusting means operatively associated therewith.

Figure 2 is an enlarged top plan view of one of the adjusting devices and adjacent portions of the finger bar and sickle bar.

Figure 3 is a longitudinal sectional view as indicated by line 3—3 of Fig. 2.

Figure 4 is a top plan view of the fulcrum member to be hereinafter described.

Figure 5 is an edge view of the member shown in Fig. 4.

In the drawing above briefly described, F designates the finger bar of a mowing mechanism, provided with the usual fingers *f* and ledger plates P. S designates the reciprocatory sickle bar having the well known knives K lying upon and co-operable with the ledger plates P.

In carrying out my invention, I provide a fulcrum member which preferably comprises two spaced horizontal feet 1 connected by a short horizontal shaft 2, the latter being elevated above the lower surfaces of said feet. The feet are secured upon the finger bar F, preferably by means of some of the usual bolts B which secure the fingers *f* to said bar, and said feet are in most instances provided with straight front edges 3 to abut the rear edges of the knives K and assist in guiding the latter. Fulcrumed upon the shaft 2, is a horizontally disposed lever 4 which is preferably composed of a front section 5 and a rear section 6, secured together by rivets or the like 7 and also preferably having a tongue and groove connection 8. The two lever sections 5 and 6 are jointly recessed to receive the shaft 2, and it will be understood that this shaft is placed in proper position before said lever sections are secured together.

The front end 9 of the lever 4 is adapted to lie upon the knives K of the sickle bar to hold them tightly down against the ledger plates P, while adjusting means for the lever are associated with its rear end, to force said front end 9 downwardly with any desired degree of force. In the present showing, the rear portion of the lever 4 is provided in its lower side with a recess 10 whose top 11 is forwardly inclined to a slight extent, and in front of this recess, said lower side of the lever is also formed with a socket 11'. A notch 12 connects the socket and recess, and another notch 13 leads to said recess through the rear end of the lever. A shoe 14 is disposed within the recess 10 and in contact with the inclined surface 11, said shoe also contacting with the relatively stationary, subjacent, upper surface of the finger bar F. Through this shoe, a longitudinal screw 15 is threaded, said screw being received in the notches 12 and 13 and having a head 16 on its front end received in the socket 11' to hold said screw against longitudinal movement. The rear end of the screw is provided with a suitable handle 17 by means of which it may be rotated, and in some instances, this handle may serve to lock the screw normally against rotation. By turning the screw in the proper direction, the shoe 14 is forced rearwardly along the inclined surface 11, causing it to tilt the lever 4, and force the front end 9 downwardly with the desired degree of pressure.

It will be seen from the foregoing that the invention is simple and inexpensive, may be quickly and easily applied, and will be very efficient and desirable. The blades of the sickle bar may be held with the necessary firmness against the ledger plates, but when said sickle bar is to be removed for repairing or grinding, the screw 15 may be operated to slide the shoe 14 forwardly, thus loosening the lever 4, so that it will not interfere with removal of the sickle bar nor with replacement thereof. Obviously, the devices may be used at any desired intervals along the length of the mowing mechanism.

As excellent results are obtainable from the details disclosed, they may well be followed. However, within the scope of the invention as claimed, numerous modifications may be made.

I claim:

1. In a mowing mechanism having a finger bar and a sickle bar; a lever extending transversely of said bars and disposed over the latter, means between the ends of the lever for fulcruming said lever on said finger bar, the front end of said lever being in sliding engagement with the upper side of the sickle bar and the rear portion of said lever being provided with a slightly inclined downwardly facing surface, a shoe contacting with said surface and with the relatively stationary subjacent surface of the finger bar, and means for adjusting said shoe toward the lower end of said inclined surface to rock the lever.

2. In an attachment for a mowing mechanism having a finger bar and a sickle bar; a fulcrum member, means for mounting the same on the finger bar, a lever fulcrumed between its ends on said fulcrum member and at one of its ends adapted to engage the upper side of the sickle bar, the other end portion of said lever having a slightly inclined downwardly facing surface, a shoe for engagement with said surface and with the relatively stationary subjacent surface of the finger bar, and adjusting means for said shoe.

3. A structure as specified in claim 2; said lever having a recess in its lower side whose top forms said inclined surface, said adjusting means comprising a screw threaded through the aforesaid shoe and having a head on one end, said lever having a socket in its lower side receiving said head to hold the screw against longitudinal movement.

In testimony whereof I have hereunto affixed my signature.

HARVEY BECKWITH.